United States Patent
Schroeder, Jr. et al.

(10) Patent No.: US 8,327,005 B2
(45) Date of Patent: Dec. 4, 2012

(54) METHOD TO SET UP APPLICATION TO APPLICATION COMMUNICATION OVER A NETWORK BETWEEN APPLICATIONS RUNNING ON ENDPOINT DEVICES

(75) Inventors: Brian S. Schroeder, Jr., Chicago, IL (US); Elmar G. Weber, Mountain View, CA (US)

(73) Assignee: Jibe Mobile, Mountain View, CA (US)

( * ) Notice: Subject to any disclaimer, the term of this patent is extended or adjusted under 35 U.S.C. 154(b) by 0 days.

(21) Appl. No.: 13/276,211

(22) Filed: Oct. 18, 2011

(65) Prior Publication Data

US 2012/0221738 A1 Aug. 30, 2012

Related U.S. Application Data

(60) Provisional application No. 61/446,045, filed on Feb. 24, 2011.

(51) Int. Cl.
*G06F 15/173* (2006.01)
*G06F 15/16* (2006.01)
(52) U.S. Cl. .................. 709/229; 709/225; 709/227
(58) Field of Classification Search .......... 709/203–207, 709/223–229
See application file for complete search history.

(56) References Cited

U.S. PATENT DOCUMENTS

| | | | |
|---|---|---|---|
| 4,236,835 A | 12/1980 | Mayne | |
| 5,134,077 A | 7/1992 | Sonoyama et al. | |
| 5,941,948 A | 8/1999 | Chang et al. | |
| 6,368,847 B1 | 4/2002 | Line et al. | |
| 6,877,036 B1 | 4/2005 | Smith et al. | |
| 6,961,345 B2 | 11/2005 | Mizuguchi et al. | |
| 7,085,552 B2 | 8/2006 | Buckley | |
| 7,166,215 B2 | 1/2007 | Reid | |
| 7,623,436 B2 | 11/2009 | Hunter et al. | |
| 7,638,045 B2 | 12/2009 | Reid | |

(Continued)

FOREIGN PATENT DOCUMENTS

WO WO-2012115742 A1 8/2012

OTHER PUBLICATIONS

"JSR 281 IMS Services API for Java(tm) Micro Edition", Specification, Maintenance Release Version 1.1, JSR 281 Expert Group, Java Community Process, (Apr. 8, 2009), 199 pgs.

(Continued)

*Primary Examiner* — Joshua Joo
(74) *Attorney, Agent, or Firm* — Schwegman Lundberg & Woessner, P.A.

(57) ABSTRACT

A method is provided to communicate media information over a network comprising: in response to a request from a first application running on a first endpoint device for a media connection with a second application running on a second endpoint device, sending a request over a network for a media connection with the second application; wherein the media connection request includes an application identifier (AppID) associated with the first application; sending an authorization request to an application manager server to obtain authorization for the requested media connection; wherein the authorization request includes the AppID associated with the first application; communicating control information over a control session set up between the first endpoint device and the second endpoint device; wherein the control information includes the AppID associated with the first application; and communicating media information over a media session.

16 Claims, 17 Drawing Sheets

U.S. PATENT DOCUMENTS

| | | | |
|---|---|---|---|
| 7,649,827 | B2 | 1/2010 | Hunter et al. |
| 7,725,329 | B2 | 5/2010 | Kil et al. |
| 7,912,734 | B2 | 3/2011 | Kil |
| 8,024,784 | B1* | 9/2011 | Issa ................................. 726/9 |
| 8,200,506 | B2 | 6/2012 | Kil |
| 2002/0124118 | A1 | 9/2002 | Colley et al. |
| 2004/0006653 | A1 | 1/2004 | Kamen et al. |
| 2005/0135388 | A1* | 6/2005 | Hartikainen et al. ......... 370/401 |
| 2005/0135622 | A1 | 6/2005 | Fors et al. |
| 2005/0278420 | A1 | 12/2005 | Hartikainen |
| 2005/0282526 | A1* | 12/2005 | Leppanen et al. ......... 455/414.1 |
| 2008/0072066 | A1 | 3/2008 | Vogler et al. |
| 2008/0126541 | A1 | 5/2008 | Rosenberg et al. |
| 2008/0215694 | A1 | 9/2008 | Chen et al. |
| 2008/0244709 | A1 | 10/2008 | George et al. |
| 2009/0228967 | A1 | 9/2009 | Gbadegesin et al. |
| 2010/0023625 | A1* | 1/2010 | Lee et al. ...................... 709/227 |
| 2010/0211686 | A1 | 8/2010 | Poikselka |
| 2010/0278345 | A1* | 11/2010 | Alsina et al. .................. 380/283 |
| 2010/0325705 | A1 | 12/2010 | Iverson et al. |
| 2011/0105154 | A1* | 5/2011 | Kim .............................. 455/458 |
| 2011/0161441 | A1* | 6/2011 | Haruna et al. ................. 709/206 |
| 2011/0202988 | A1* | 8/2011 | Otranen et al. .................... 726/8 |
| 2011/0314161 | A1* | 12/2011 | Andreasen et al. ........... 709/226 |
| 2012/0030742 | A1 | 2/2012 | Lundblade |
| 2012/0221725 | A1 | 8/2012 | Schroeder, Jr. et al. |
| 2012/0221739 | A1 | 8/2012 | Schroeder, Jr. et al. |

OTHER PUBLICATIONS

Bertrand, Gilles, "The IP Multimedia Subsystem in Next Generation Networks", Online. May 30, 3007. Retrieved from the Internet: <URL: http://www.tele.pw.edu.pl/~mareks/auims/IMS__an__overview-1.pdf >, 9 pgs.

Khan, Afaq H, et al., "IMS Network Architecture and Assessment of Its Clients for Various Access Networks", ICaST, ICST's Global Community Magazine, (Jun. 2010), 10 pgs.

Noldus, Rogier, et al., "Multi-Access for the IMS Network", Ericsson Review No. 2, (2008), 81-86.

"U.S. Appl. No. 13/276,220, Non Final Office Action mailed Apr. 27, 2012", 12 pgs.

"U.S. Appl. No. 13/276,229, Non Final Office Action mailed Mar. 16, 2012", 13 pgs.

"International Application Serial No. PCT/US2012/022555, Invitation to Pay Additional Fees mailed May 4, 2012", 2 pgs.

Newton, Harry, "Newton's Telecom Dictionary, 18th Edition", New York: CMP Books, (Feb. 2002), p. 65.

Rosenberg, J., et al., "SIP: Session Initiation Protocol", Network Working Group, Request for Comments: 3261, (Jun. 2002), 272 pgs.

"U.S. Appl. No. 13/276,220, Response filed Jun. 14, 2012 to Non Final Office Action mailed Apr. 27, 2012", 21 pgs.

"U.S. Appl. No. 13/276,229, Response filed Jun. 14, 2012 to Non Final Office Action mailed Mar. 16, 2012", 17 pgs.

"U.S. Appl. No. 13/276,220, Notice of Allowance mailed Jul. 20, 2012", 9 pgs.

"International Application Serial No. PCT/US2012/022555, International Search Report mailed Jul. 13, 2012", 6 pgs.

"International Application Serial No. PCT/US2012/022555, Written Opinion mailed Jul. 13, 2012", 9 pgs.

"U.S. Appl. No. 13/276,229, Notice of Allowance mailed Sep. 5, 2012", 8 pgs.

"Terminal Disclaimer Filed", U.S. Appl. No. 13/276,229.

* cited by examiner

METHOD TO SET UP APPLICATION TO APPLICATION COMMUNICATION OVER A NETWORK BETWEEN APPLICATIONS RUNNING ON ENDPOINT DEVICES

RELATED APPLICATION

This application claims priority to commonly owned U.S. Provisional Patent Application No. 61/446,045 filed Feb. 24, 2011, which is expressly incorporated herein by this reference. This application is related to commonly owned application entitled, SYSTEM AND METHOD TO CONTROL APPLICATION TO APPLICATION COMMUNICATION OVER A NETWORK, filed on even date herewith. This application is related to commonly owned application entitled, ENDPOINT DEVICE AND ARTICLE OF MANUFACTURE FOR APPLICATION TO APPLICATION COMMUNICATION OVER A NETWORK, filed on even date herewith.

BACKGROUND

The IP multimedia subsystem (IMS) network architecture is an example of an end-to-end architecture that enables the delivery of real time multimedia services using IP related technologies. It merges Internet, fixed wireline telephony and cellular capabilities. It manages different access related constraints imposed by heterogeneous access technologies such handover and roaming between different networks in radio access networks and supports many kinds of equipment. There is an expanding need to provide application-to-application communication among a growing variety of applications over networks that support a variety of communications technologies such as, text based chat, photo/video/music/file transfer, live video sharing, group chat, location sharing or any kind of 2-way or group communications, for example. The present invention meets this need.

SUMMARY

In some embodiments, a method is provided to communicate media information over a network. In response to a request from a first application running on a first endpoint device for a media connection with a second application running on a second endpoint device, sending a request over a network for a media connection with the second application. The media connection request includes an application identifier (AppID) associated with the first application. In response to the request by the first application, an authorization request is sent over the network to an application manager server to obtain authorization for the requested media connection. The authorization request includes the AppID associated with the first application. Control information is communicated over a control session set up between the first endpoint device and the second endpoint device in response to the media connection request. The control information includes the AppID associated with the first application. Media information is communicated over a media session set up between the first endpoint device and the second endpoint device in response to the media connection request.

BRIEF DESCRIPTION OF THE DRAWINGS

FIG. 2A shows an illustrative signal flow protocol that includes multiple communication stages S0-S5 in which an A2A communication engine running on a device causes sending of an authorization request to an application management server in response to a media connection request received from an application running on the device in accordance with some embodiments; and FIG. 2B shows an illustrative alternate signal flow protocol that includes communication stages S0-S1 and S4-S5 and that avoids communication stages S2-S3, in which an A2A communication engine running on a device causes periodic sending of an authorization request to an application management server in to determine authorization for applications currently registered on the device in accordance with some embodiments.

DESCRIPTION OF THE EMBODIMENTS

The following description is presented to enable any person skilled in the art to create and use a system, method and article of manufacture to ensure secure authenticated application-to-application communication over a multimedia network. Various modifications to the preferred embodiments will be readily apparent to those skilled in the art, and the generic principles defined herein may be applied to other embodiments and uses without departing from the spirit and scope of the invention. The disclosure describes applications and process module that are implemented with computer program code stored in volatile storage such as RAM or non-volatile storage such as Disk or Flash, for example, to configure one or more processors to implement acts specified for such applications or modules. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1A:
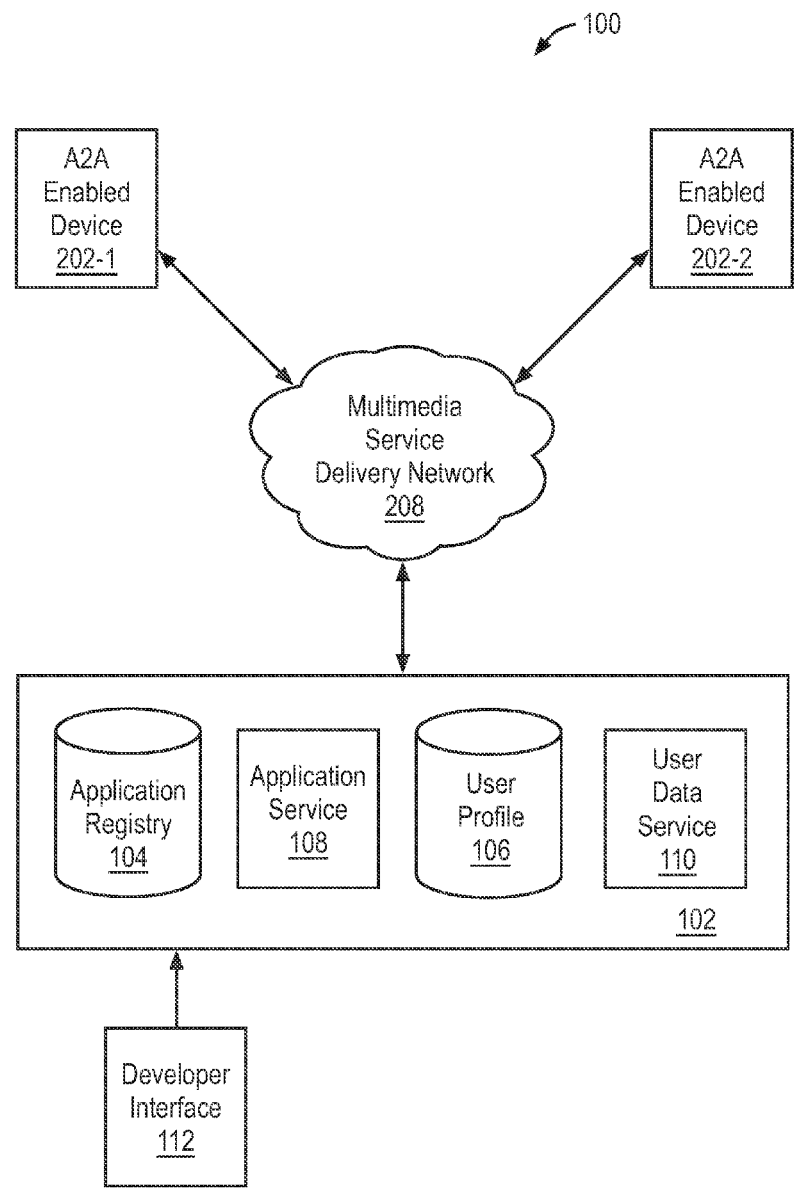
FIG. 1A is an illustrative drawing showing a system in accordance with some embodiments.

FIG. 1A is an illustrative drawing showing a system 100 in accordance with some embodiments. The system 100 includes a first endpoint device 202-1 and a second endpoint device 202-2 that communicate over a multimedia service delivery network architecture 208. The endpoint devices may comprise mobile cellular wireless devices, set top boxes, tablet computers, automotive navigation/entertainment systems, gaming consoles, personal computers or some combination of these. In some embodiments, the network architecture 208, comprises the IMS architecture.

The first and second endpoint devices 202-1, 202-2 are configured for application-to-application (hereinafter "A2A") communication. That is, an application operative on the first device 202-1 can communicate with an application operative on the second device 202-2. For example, multiuser A2A communication game applications may exchange game data as well as in-game audio and video allowing users to talk and see each other while playing. As another example, multimedia A2A communication messaging applications may provide text based chat, photo/video/music/file transfer, live video sharing, group chat, location sharing or any kind of 2-way or group communications. As yet another example, a multiplayer A2A communication game application may include low latency, peer to peer data exchange between two or more parties, and/or including other multimedia features such as audio, video or text based chat. Other examples of applications involving A2A communication may involve unified communications applications, customer care applications, social/dating apps, enterprise apps. These example A2A communication applications may utilize the same features such as peer to peer data exchange, multimedia message exchange (text-based, video, audio, photo or other multimedia types). Other A2A communication applications might include audio/video conferencing applications. As explained more fully below, the devices establish one or more media sessions on which applications may communicate media data with other applications.

An A2A application manager server 102 is in a control path during creation of media session between A2A enabled applications. The server 102 manages authorization of media connections between A2A applications. More particularly, a multiplicity of different A2A applications may run on a variety of different endpoint devices. The application manager server 102 manages authorization of media connections between applications that runn on endpoint devices and that are enabled for A2A communication (hereinafter "A2A enabled applications")

Management authorization involves identifying the A2A enable application. Also, management authorization involves validating that a request ostensibly received from an identified A2A enabled application to establish A2A communication with another A2A enabled application actually was sent by the A2A enabled application that purports to have sent it. In addition, in some embodiments, management authorization involves applying one or more policies to determine whether an application is authorized for a user identified in a request.

In some embodiments, the application management server includes an application registration interface 112, which may be implemented as a web server, database, remote process or other means of making centrally managed data available to distributed clients and other systems for use to designate Application Identifier ("AppID") and application secret information, i.e. non-public, information that is to be associated with the A2A enabled applications. In some embodiments, a developer uses the application registration interface 112 to register an A2A enabled application. In a pre-registration scenario, a developer registers an application within the application registry 104. An AppID and an application secret are returned and indexed to the application. The AppID is used to route all messages between applications through matching of AppIDs in messages to AppIDs of applications. This registration is a one-time event and happens once for the application deployment. The application secret is used to dynamically create the application token. In a dynamic registration scenario, the developer does not register the application in advance but has a developer key or token that allows dynamic registration of multiple applications. This is a "trusted developer" that has been authorized on the platform. A developer key would be passed during the application registration at runtime, and validated against a list of white-listed developer keys in the backend registry database. Characteristics can be associated with each developer key that limit dynamic registrations, or the number of distinct applications that can be registered, or by mobile operator, as an example. Other characteristics are possible. During dynamic registration, the developer key is passed on startup or installation of the application, in order to retrieve an AppId and application secret. The application secret could be valid for that session, or longer period as defined by the platform.

When an AppId is registered, the developer/application also may specify what types of messages can be received by the application corresponding to this AppID. Some possible options are: 1) application can only receive messages from the same application/AppID; 2) application can receive messages from a defined list of applications which are white listed in the application registry 102 for this AppID; 3) application can receive message from a particular developer; 4) application can receive all messages from a specific network or network operator, for instance initiating from a mobile network in a specific or list of countries; 5) application can receive messages from anybody. Other restrictions are also possible and can be added to the registration parameters of the Application Id registration.

AppIDs are identifiers that uniquely identify A2A enabled applications within the system 100. In other words, each different kind of A2A application may be associated with its own unique AppID. AppIDs can be generated using different approaches and can have different formats including but not limited to numeric identifiers (e.g. 1234), alphanumeric identifiers (e.g. acme-application-1), host/domain/package names (e.g. com.acme.xyz) and random values.

The secret information associated with an A2A enabled application is used to generate a token (a signature) that is sent over the network 208 as part of a media request for use by the application management server 102 in validating the source of the media connection request. In some embodiments, the token is generated dynamically as a function of AppID, the secret information and other information uniquely associated with the request such as header information, a timestamp or a nonce, for example. It will be appreciated that the use of information associated with characteristics of the particular request to generate the token helps to avoid replay attacks, for example. In some embodiments, the token is created through a hashing technique such as an MD5 hash or an HMAC-SHA1 hash, for example. The mechanics of token generation are not within the scope of this invention. There are several common approaches for computing tokens, hashes, etc. readily available to those skilled in the art. The application management server 102 also possesses (shares) the secret information associated with the AppID and uses that secret information and the token to validate that the media connection request is in fact sent by the A2A enabled application that purports to have sent it. Thus, the server 102 uses the token to validate the request obviating the need to send the secret over the network 208.

The A2A server 102 includes an A2A application registry 104 and a user profile registry 106 each encoded in a non-transitory storage and the A2A application manager server 102 implements an application service 108 and a user data gathering service 110.

Table 1 provides an example information structure for an application registry 104 encoded in non-transitory storage in accordance with some embodiments.

TABLE 1

| AppID | Secret Information | Meta-Data |
| --- | --- | --- |

The application registry 104 includes a multiplicity of AppIDs each uniquely identifying a different A2A enabled application. Each AppID in the registry is associated with secret information used to validate the source of a media connection request. Each AppID may be associated with meta-data that indicate rules associated with the A2A application that corresponds to the AppID.

Table 2 provides an example information structure for user profile registry 106 encoded in non-transitory storage in accordance with some embodiments.

TABLE 2

| userID | User Profile Information |
| --- | --- |

The user profile registry 106 provides user profile information associated with a user identified in a request for a media connection. The user profile information may include information such as service subscription states, user-subscribed Quality of Service information (such as maximum allowed bit rate or allowed traffic classes). In some embodiments, the application management server 102 obtains information within the profile registry 106 from a mobile operator database such as the HSS (Home Subscription Server), a master database of 3G networks containing user subscription-related information. In some embodiments, the user profile registry 106 acts as an extension of a mobile operator database.

Figure 1B:
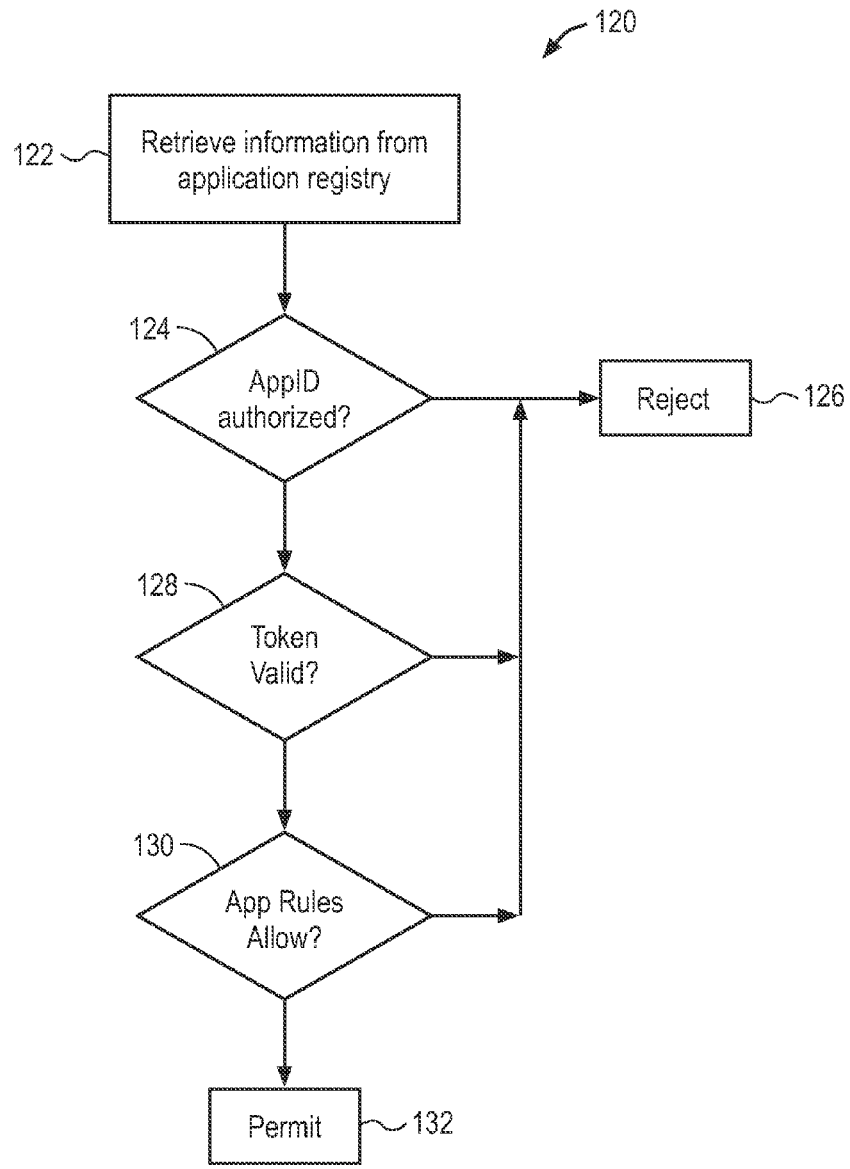
FIG. 1B is an illustrative flow diagram of a first process implemented using the application manager server of FIG. 1A in accordance with some embodiments.

FIG. 1B is an illustrative flow diagram of a first process 120 implemented using the application service 108 of the application management server 102 of FIG. 1A in accordance with some embodiments. Upon receipt of a request originated by an A2A application running on a first endpoint device 202-1 to set up A2A communication with a second device 202-2 involving instances of an A2A application associated with a particular AppID and associated secret information, module 122 attempts to retrieve from the application registry 104 a set of information corresponding to that AppID. In some embodiments, the first endpoint device 202-1 sends the request over the network 208. The request includes instructions that cause a proxy server (described below) within the network 208 to direct the request to the application management server 102. Decision module 124 determines whether the AppID is registered, i.e. whether the application registry 102 indicates that the AppID identifies a valid A2A enabled application. If decision module 124 determines that the AppID is not stored within the registry 104, then module 126 provides a message indicating that the request is rejected. In some embodiments, the rejection message is sent to the proxy server, which in response to the rejection determines to not transmit the request to the second device 202-2.

If decision module 124 determines that the AppID is stored within the registry 104, then control flows to decision module 128, which determines whether the request includes a valid token indicating that the request actually originated with an authorized A2A enabled application and is not 'spam', for example. Token validation involves using secret information associated in the application registry 102 with the AppID contained in the request. In some embodiments, token validation involves reversing a hash of header information within the request as explained above to produce transformation information. If decision module 128 determines that the transformation information does not match the secret information associated with the identified AppID, then the request does not include a valid token, and as described above, module 126 provides a message indicating that the request is rejected. In some embodiments, module 126 sends a message over the network to inform the endpoint device that originated the request that the request has been rejected.

If decision module 128 determines that the request includes a valid token, then control flows to decision module 130, which determines whether the request complies with rules or policies indicated by meta-data associated in the application registry 102 with the AppID provided with the request. If decision module 130 determines that a rule associated with the AppID indicates that the request should be rejected, then module 126 provides a message indicating that the request is rejected. However, if decision module 130 determines that no rule or other criteria precludes granting the request, then module 132 accepts the request. In some embodiments, accepting the request involves forwarding the request over the network to the endpoint device to which the request is addressed.

Figure 1C:
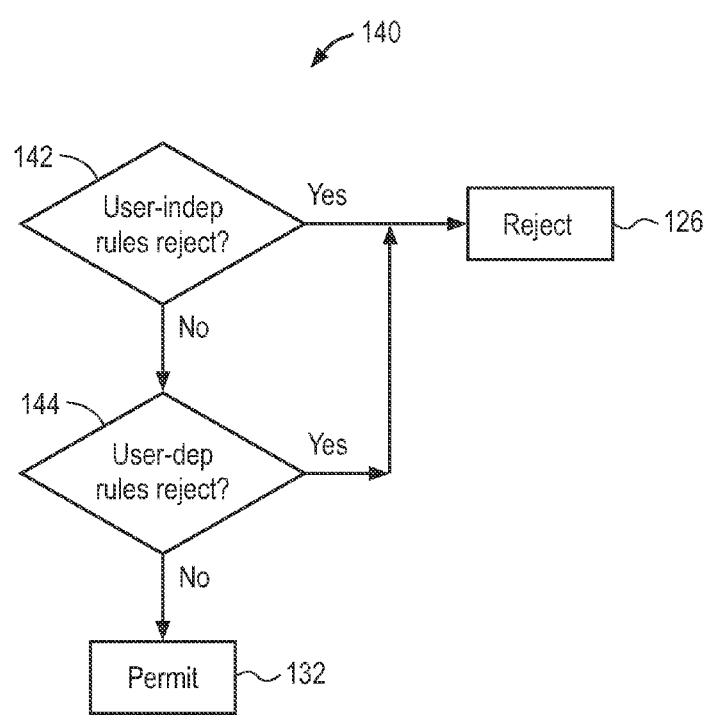
FIG. 1C is an illustrative flow diagram that indicates details of decision module within the first process of FIG. 1B in accordance with some embodiments.

FIG. 1C is an illustrative flow diagram 140 that indicates details of decision module 130 in accordance with some embodiments. Decision module 142 determines whether meta-data associated with the AppID includes one or more rules that are applicable independent of identity of a user identified in the message as making the request. As used herein, a user includes individual users and categories of users such as users associated with a particular group or organization or with a department within an organization, for example. For example, an A2A enabled application might be black-listed globally due to a known security or fraud issue. If decision module 142 determines that a rule indicates that the request should be rejected, then module 126 provides a message indicating that the request is rejected. If decision module 142 determines that there is no user-independent rule that requires rejection of the request, then control flows to decision module 144, which determines whether user-dependent rules in conjunction with meta-data associated with the AppID indicate the authorization request is to be rejected. If decision module 144 determines that user-dependent rule indicates that the request should be rejected, then module 126 provides a message indicating that the request is rejected. Otherwise, module accepts the request.

Figure 1D:
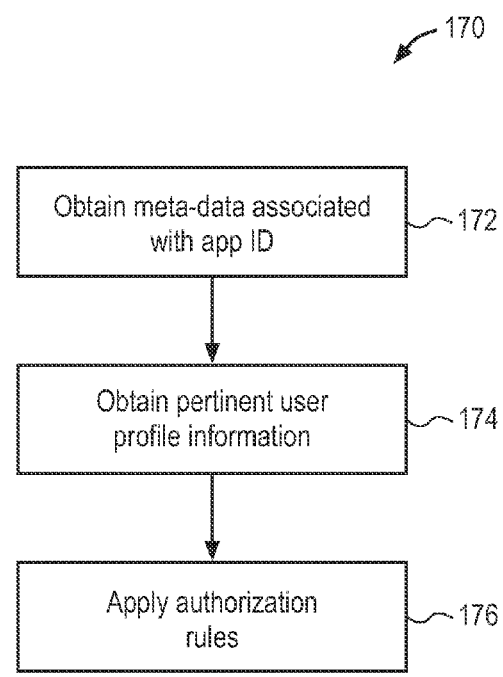
FIG. 1D is an illustrative flow diagram that indicates details of a decision module within the first process of FIG. 1C accordance with some embodiments.

FIG. 1D is an illustrative flow diagram 170 that indicates details of decision module 144 in accordance with some embodiments. Module 172 obtains application meta-data associated with the AppID. Module 174 obtains user profile information pertinent to the application meta-data. Module 176 applies one or more authorization rules as a function of the user profile and the application meta-data. For example, an A2A enabled application might be blacklisted for particular customers based on their mobile phone contract (e.g. certain video chat applications should not be available to minors). Other A2A enabled applications might only be available on premium contracts (e.g. HD quality video conferencing).

It will be appreciated, therefore, that a request sent over a network 208 by an A2A enabled application 204-1 running on a first endpoint device 202-1 for media communication with another A2A enabled application 204-2 running on a second endpoint device 202-2 can be authorized on the basis of meta-data associated with the application and profile information associated with the user of the application.

Figure 1E:
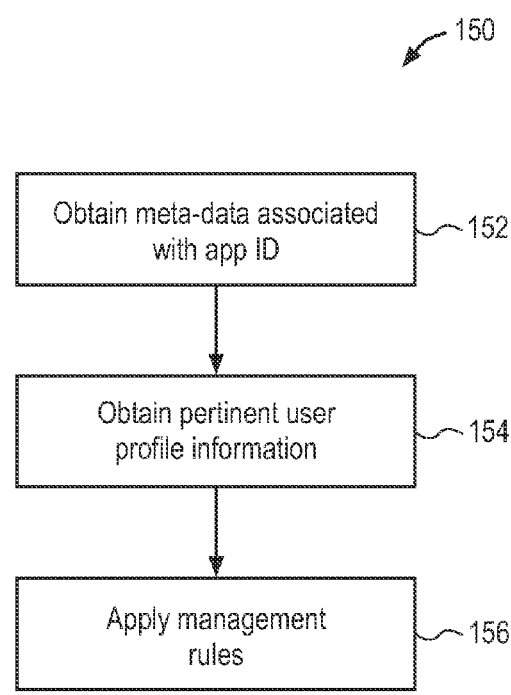
FIG. 1E is an illustrative flow diagram of a second process implemented by the application manager server of FIG. 1A in accordance with some embodiments.

FIG. 1E is an illustrative flow diagram of a second process 150 implemented using the user data service 108 of the application management server 102 of FIG. 1A in accordance with some embodiments. Module 152 obtains application meta-data associated with the AppID. Module 154 obtains user profile information pertinent to the application meta-data. Module 156 applies one or more user management rules as a function of the user profile and the application meta-data. A management rule, for example, may generate a log of rejected requests for statistics, inform the user of the requesting device via the mobile operators customer support system of the rejection (e-mail, sms, etc) or communicate this information back to the user via other means. As another example, a management rule within may specify that special billing rates apply to a particular user when accessing an application associated with a particular AppID. For instance a user may have subscribed to use a particular game application at a special rate. As yet another example, a management rule may generate charging detail records (CDRs) which are processed by the billing system of a mobile operator. As yet another example, a management rule may configure the manager server 102 to interact with a prepaid billing systems or interact with other means of settlement such as Paypal service, credit card, for example. As still another example, a management rule included within one or the other of the application registry 102 or the identity registry 106 may indicate that an A2A enabled application associated with a particular AppID should be provided a certain quality of service and should be billed at a certain rate regardless of user identity. For instance, an application involved with the delivery of emergency medical service may be given highest priority for communication over the network and also may be billed at a premium rate.

Figures 1, 2A:
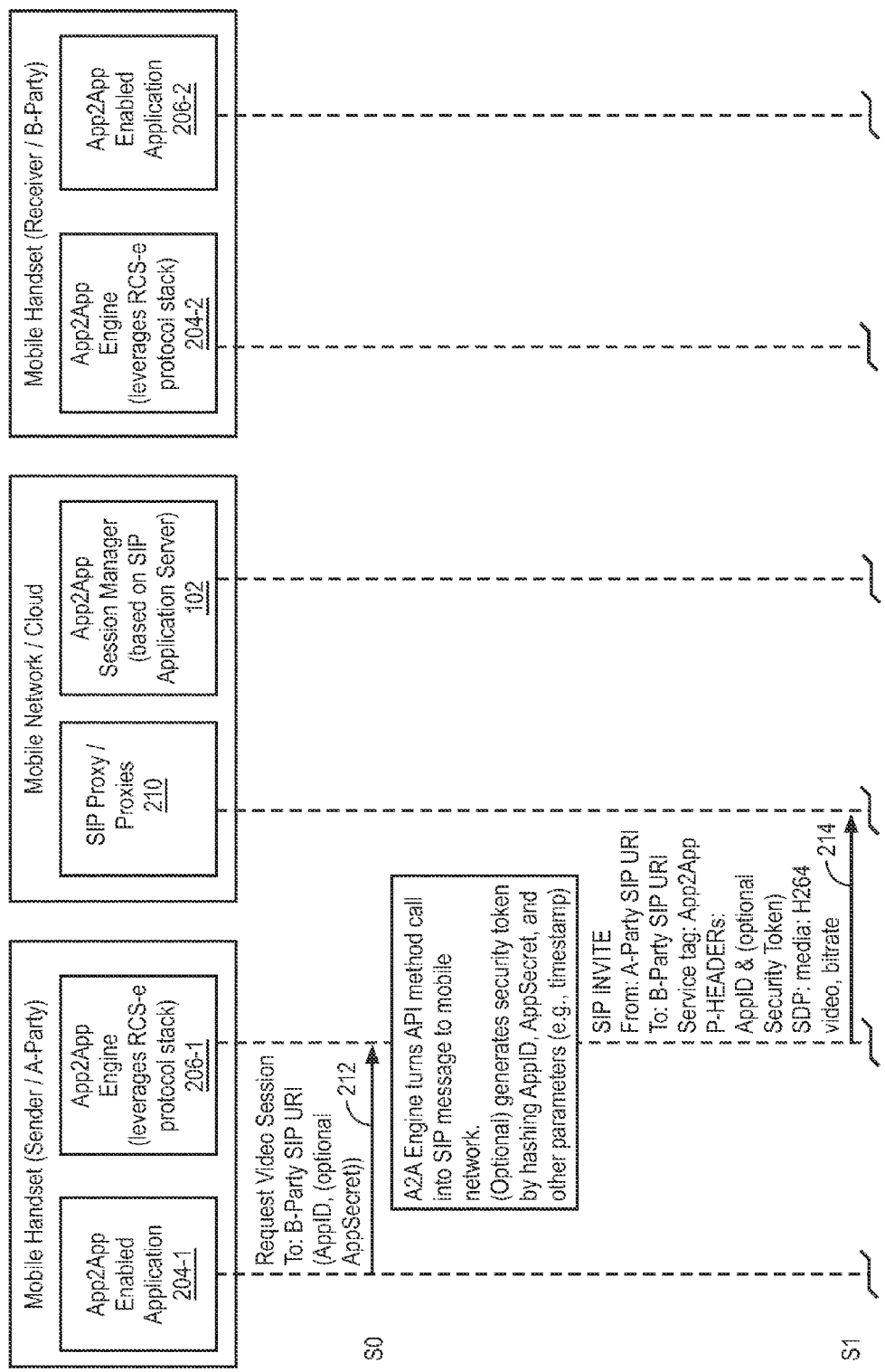
FIGS. 2A-2B are illustrative drawings showing alternative signal flow protocols to initiate communication between applications on endpoint devices of the system of FIG. 1 in accordance with some embodiments.
Figures 2, 2A:
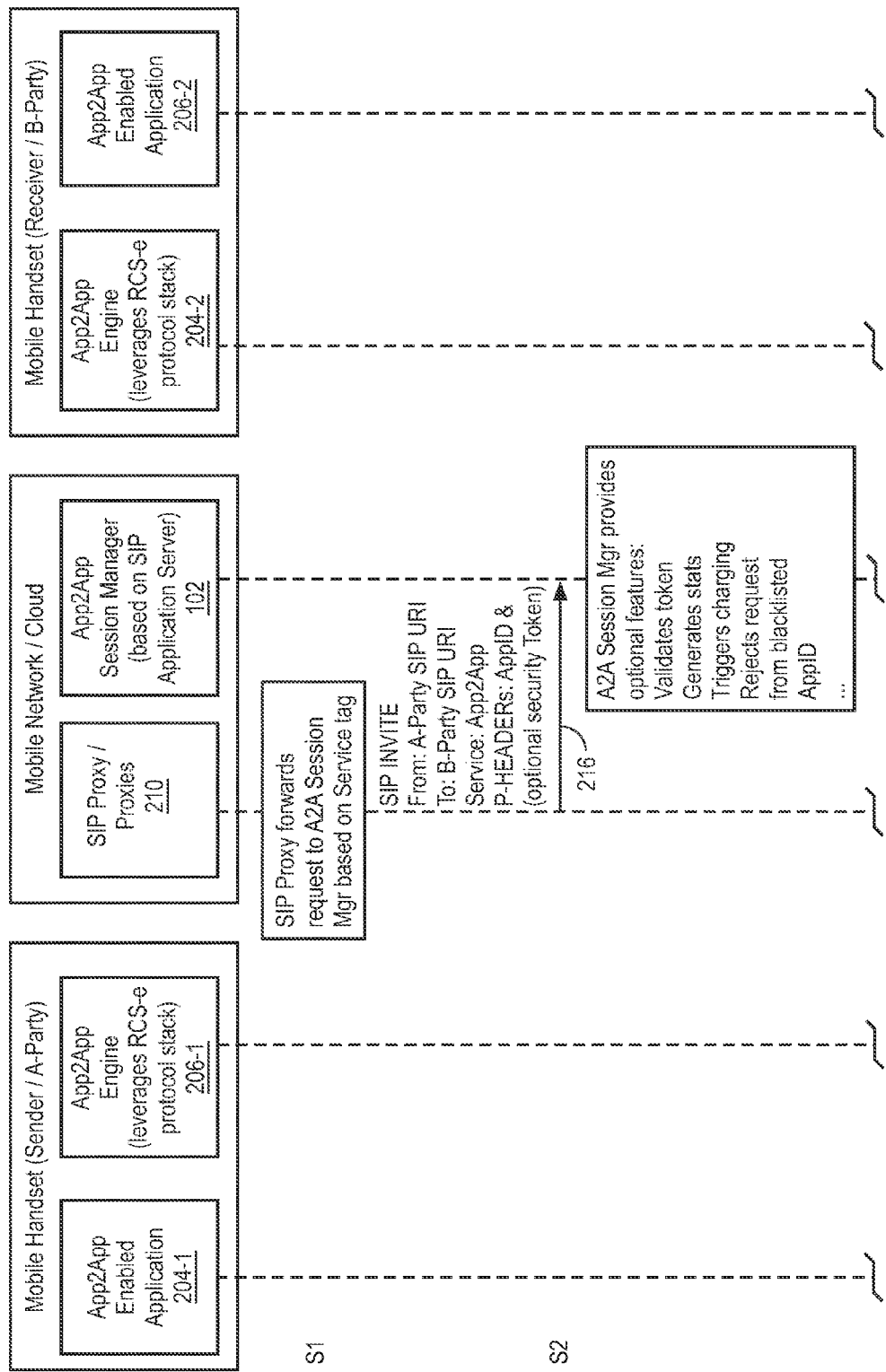

FIG. 2A is an illustrative drawing showing a signal flow protocol to initiate media communication between applications on endpoint devices of the system 100 of FIG. 1 in accordance with some embodiments. The system 100 includes the first endpoint device 202-1, the second endpoint device 202-2 and the communication network 208. The first endpoint device 202-1 includes non-transitory computer readable storage encoded with a first instance of an A2A enabled application 204-1 that configures the first device 202-1 to implement functionality associated with that application, and the second endpoint device 202-2 includes non-transitory computer readable storage encoded with a second instance of an A2A enabled application 204-2 to implement functionality associated with the same application.

As used herein, the term 'application' refers to an application that has a user interface and that has media communication capabilities, such as VOIP, video, peer-to-peer packet data communications, file transfer and chat, for example. Furthermore, the term 'application' is to be interpreted to include, for example and without limitation, a stand-alone application, which may be associated with a plurality of files and system settings, system software, a run-time library, or a plug-in or extension, such as a browser plug-in. For purposes herein, an application is an executable file or group of files that generate a user interface. When both the first and second A2A enabled applications are launched, they configure both endpoint devices to implement the same A2A enabled application. The first device 202-2 is configured to implement a first instance of an A2A communications engine 206-1, and the second device 202-2 is configured to implement to implement a second instance of the A2A communications engine 206-2.

An IMS implementation of the network 208, sometimes referred to colloquially as a network 'cloud', includes multiple SIP proxy servers 210 (one shown) and an A2A application manager server 212. The term 'SIP' stands for Session Initiation Protocol. The term 'session' refers to a set of one or more senders and receivers that communicate and the state stored in those senders and receivers during the communication. Although the disclosed embodiment uses SIP messages, other message protocols such as the Skype protocol, extensions to XMPP such as Jingle (for audio) and other common protocols for establishing peer to peer communication may be used as alternatives. A 'server' is a machine, e.g. a computer, configured to provide information or routing services to other to other machines. A machine (e.g., a computer or a smart phone) requesting access to a server is considered a client of the machine.

It will be appreciated that the network 208 typically routes signals among infrastructure components and does not configure a fixed path for data communication during a session, and that state is maintained in endpoint devices. Examples of a session can include Internet telephone calls, distribution of multimedia, multimedia conferences, distributed computer games, etc. SIP is an end-to-end oriented signaling protocol that conforms to the Internet model and in which that all the logic is stored in end devices (except routing of SIP messages). SIP proxy servers 210 perform routing of an invitation sent by an inviter device to an invitee device according to factors such as the invitee device's current location, authentication and accounting, for example. In practice, a session invitation sent by an inviter device often traverses a multiple SIP proxies 210 (only one shown) until it finds one which knows the actual network location of the invitee device. The invitee device then can accept or decline the session invitation.

It will be appreciated further that details of the mobile network 208 may vary depending upon access technology used. Moreover, set up of a SIP session may involve communications among a variety of network components. For example, set up of a SIP session also may involve communication with a registrar server (not shown), a SIP entity that receives registrations from users, extracts information about their current location (e.g., IP address, port and username) and stores the information into location database that can be accessed by SIP servers. Set up of a SIP session also may involve communication with a redirect server (not shown) that receives a request, looks up the intended recipient of the request in the location database created by a registrar, and sends back a reply containing a list of the current location of a particular user. Thus, it will be appreciated that the network 208 may include numerous proxy servers, redirect servers, registrar servers and other infrastructure components used for wireless, telephony and Internet communications, however. In order to avoid unnecessary complexity in this description, however, activity of the network 208 involved with SIP session set up is represented by the proxy server 210.

FIG. 2A shows multiple communication stages, S0-S5, of communication among components of the system 100 involved with setting up a communication session between the first and second instances of A2A application 204-1, 204-2. Setting up communication between the first endpoint device 202-1 and the second endpoint device 202-2 involves sending signals over the network 208. As explained above, a SIP proxy server 210 is used to route session invitations from an inviter endpoint device to an invitee endpoint devices. In the example signal flow of FIG. 2A, the first endpoint device 202-1 is assumed to be the inviter device and the second endpoint device 202-2 is assumed to be the invitee device. It will be appreciated that additional messaging may be involved in setting up a session. However, details of such possible additional messaging are unimportant to the present invention and will be readily understood by persons skilled in the art, and therefore, will are not discussed herein.

During stage S0, the first instance of A2A enabled application 204-1 on the first endpoint device 202-1 configures the device 202-2 to send a request 212 to a first instance of the A2A communications engine 206-1 to establish a media session with a second instance of the A2A enabled application 204-2 on the second endpoint device 202-2. The A2A engine 206-1 and the A2A engine 206-2 act as interfaces between the A2A enabled application instances 204-1 and 204-2 and respective communication protocol stacks as described more fully below. In some embodiments, the request 212 involves a method call to the first instance of the A2A communications engine 206-1 running within the first device 202-1. In some embodiments, a method call may involve a procedure call in C, C++, Java or other common programming or scripting languages. A method call also may involve a message using available mechanisms such as pipes, queues or sockets or a remote procedure call to a separate process using AIDL, RMI, CORBA or other mechanisms.

Figures 2, 2A, 3:
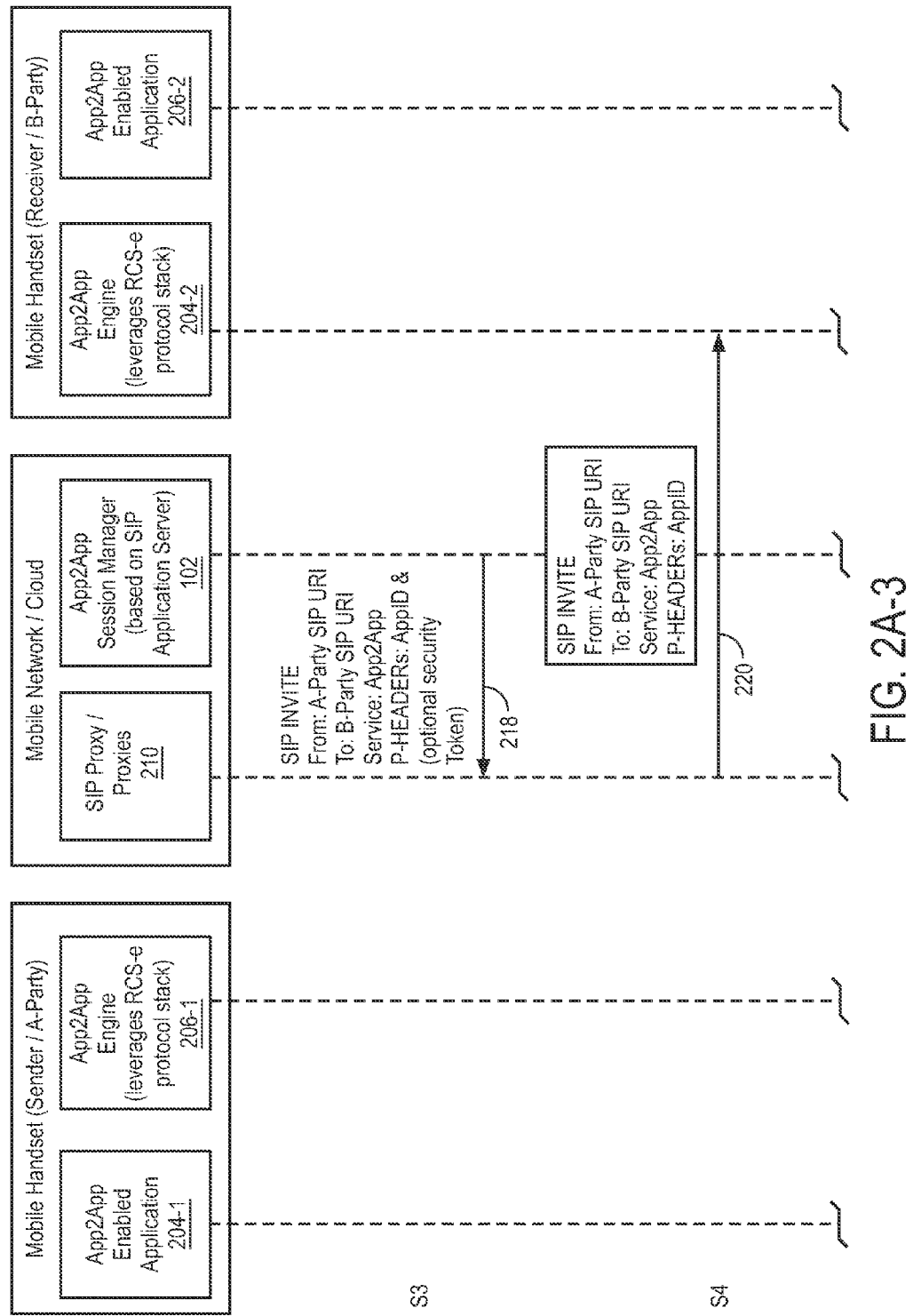
FIG. 3 is an illustrative drawing showing certain fields within the structure of an example request in accordance with some embodiments.

FIG. 3 is an illustrative drawing showing certain fields within the data structure of an example method call request 212. A SIP URI (Uniform Resource Identifier) field identifies the invitee device 202-2. An AppID field uniquely identifies the requesting application. Depending upon the implementation, security information field may include token information used for security or secret information used to generate a token. The requested request also may include additional information such as the type of media session requested, which may involve one or more types of media such as voice, video, file transfer, chat, group chat, real time peer-to-peer data transfer or application presence, for example.

During stage S1, the first instance of the A2A communications engine 206-1 configures the first endpoint device 202-1 to act as an interface that converts the request 212 to a SIP invite message 214 suitable for transmission to the SIP proxy 210 within the endpoint network 208. As explained above, actual transmission may involve traversal of several different proxies, and possibly, the use of a registrar server (not shown) and a redirect server (not shown) within the network 208, for example. The example SIP message 214 comprises an invitation from the first endpoint device 202-1 having a first identifier (e.g., a first SIP URI) to the second endpoint device 202-2 having a second identifier (e.g., a second SIP URI).

Figures 2, 2A, 3, 4:
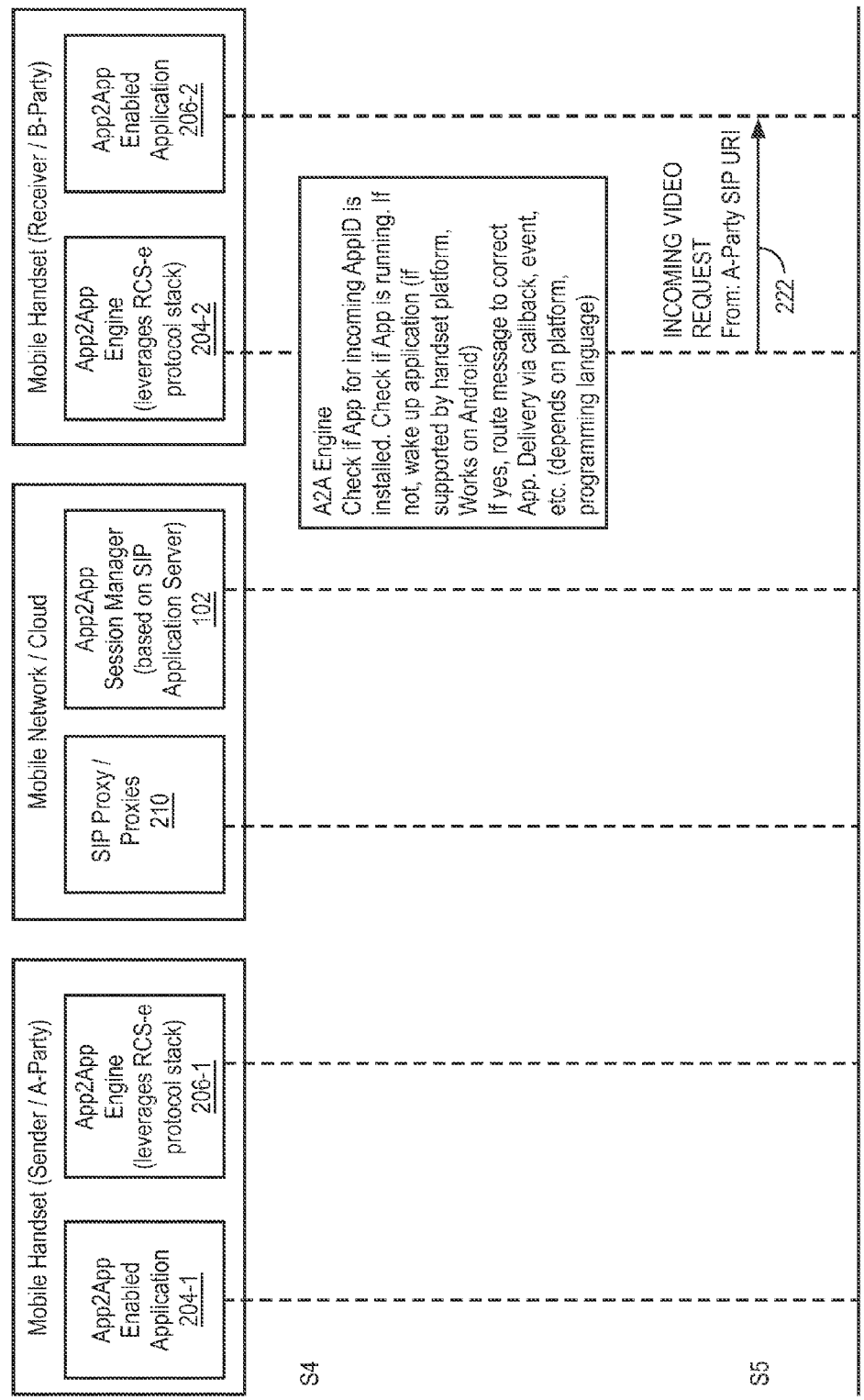
FIG. 4 is an illustrative drawing showing certain header fields within the structure of an example message in accordance with some embodiments.

FIG. 4 is an illustrative drawing showing certain header fields within the structure of an example SIP message 214. 'From' and 'To' address fields indicate the first SIP URI and the second SIP URI, respectively. A service tag field indicates the communication type as being 'App2App' (i.e. application-to-application). An AppID field provides a globally unique identifier that acts as a parameter to identify and track the unique type of application throughout the communication session. In some embodiments, an optional security information field includes a security token used to authenticate the message. An SDP field provides information used to negotiation media transmission during the session. In this example, the media includes video media using H264 format and having a specified bitrate (not shown), for example.

During stage S2, in response to the service tag which indicates that the message contains a request by an A2A enabled application associated with an AppID, the SIP proxy 210 sends a message 216 to the A2A application manager 102 which evaluates the media session request. More particularly, in some embodiments, the service tag acts as an instruction to the proxy server 210 to send an authorization request 216 to the application manager server 102 prior to forwarding the request to the second endpoint device 202-2. Thus, request 214 encapsulates instructions to make request 216. In some embodiments, the message 216 includes the header information shown in and described with reference to FIG. 4. In response to the message 216, the A2A application manager 102 employs the first and second processes described with reference to FIGS. 1B-1E to perform one or more functions such as validating the security information, generating usage statistics, triggering charges for the media session and determining whether a media session request should be rejected due to failure of security or due to blacklisting of the AppID for a particular device or user, for example. It will be appreciated that the inclusion of the service tag indicating an A2A enabled message in effect acts to direct the proxy server 210 to request authorization from the application manager to make the media connection. Thus, the SIP invite 214 encapsulates both a request to to create a media connection with a second instance of the A2A enabled application 204-2 running on the second endpoint device 202-2 and a request to the application manager server 102 for authorization of the A2A application having the AppID contained within the SIP message.

During stage S3, in response to message 216 and upon completion of such A2A application manager functions the, A2A application manager 102 sends a message 218 to the proxy server 210 that identifies the sending and receiving endpoint devices 202-1, 202-2, the requested service, App2App service and the AppID and that indicates whether the requested media session should be accepted or rejected. In some embodiments, the A2A application manager 102 forwards SIP messages/requests that are determined to be authorized over the network 208 on to the second endpoint device 202-2. If the request is rejected the A2A application manager 102 sends a notification of the rejection to the first endpoint device 202-1 that originated the request. During stage S4, the proxy server 210 sends message 220 including information within the structure of FIG. 4 to the second instance of the A2A communications engine 206-2 running on the second endpoint device 202-2. The A2A communications engine 206-2 determines whether an instance of the application corresponding to the AppID in the message 220 has been installed and is running on the second endpoint device 202-2. If an instance of the application 204-2 has been installed but is not yet running, then in some embodiments, the A2A communications engine 206-2 wakes up the application.

If an instance of the application 204-2 has not been installed, then the A2A communications engine 206-2 In general, the A2A communications engine 206-2 will have prior knowledge as to whether the endpoint device 202-2 has installed an instance of the requested application 204-2. However, in some embodiments, if the application has not been installed then the A2A communications engine 206-2 automatically declines the invitation. In some embodiments, the A2A communications engine 206-2 also prompts the second endpoint device 202-2 to download the missing application by using the AppId from the missed invitation to look up the application in the application registry 104 where metadata such as the download link for the missing application can be obtained. In some embodiments, a user interface on the second endpoint device 202-2 indicates the missed invitation to the device user and provides information concerning how to obtain the missing application. For example, such message may in provide a message such as "missed invitation/challenge to play application named "abc". (The name of the application may differ from its AppID) Click here to download".

During stage S5, assuming that the application is installed and is running (or awakens), the A2A communications engine 206-2 sends message 222, which includes information within the structure of FIG. 4 to the second instance of the application 204-2 running on the second endpoint device 202-2. In some embodiments, depending upon the second endpoint device platform and/or programming language, delivery of the message 222 may occur through a callback/event mechanism, procedure call or other platform specific means for inter-process communication (e.g. "intents" on the Android platform) for example. In general, in some embodiments, messages are acknowledged at the SIP protocol level (ACK and OK messages). Where applicable, timeouts are also associated with the messages (e.g. the INVITE). With the SIP protocol, for example, a 'VIA" header may be used to indicate which network nodes to traverse to arrive at the inviter endpoint device 202-1. With a timeout, the inviter device 202-1 would observe that the invitee device 202-2 failed to accept the invitation as opposed to the invitee device 202-2 affirmatively rejecting the invitation.

Figure 2B:
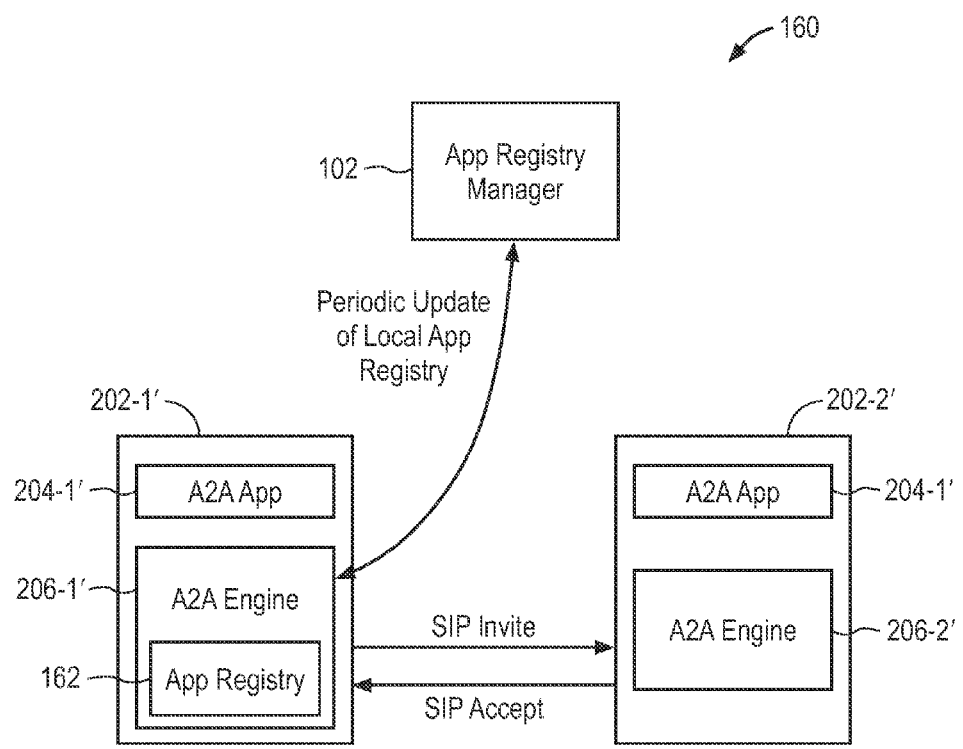
Figures 3, 4:
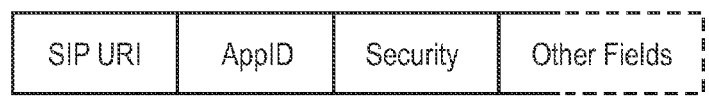

FIG. 2B is an illustrative drawing of an alternative system 260 in accordance with some embodiments. Components of the alternative system 160 are substantially the same as those described with reference to FIGS. 1A-2A. Thus, the differences between the system 100 and the system 160 are described. Specifically, the A2A engine 206-1' is configured to periodically request indication of AppIDs for A2A enabled applications that are currently authorized. Specifically, the A2A engine 206-1' periodically requests AppID authorization for applications currently registered on the device 202-1'. The A2A engine 206-1' maintains a local endpoint device application registry 162 that indicates authorized A2A enabled applications. In response to a request from the A2A enabled application having an associated AppID to set up a media session, the A2A engine makes a determination based upon contents of the registry 162 of whether the A2A enabled application 204-1' is authorized based upon its AppID. Thus, stages S2, S3 of the signal flow of FIG. 2A can be avoided.

The first endpoint device 202-1' can send a SIP invite 164 over the network (not shown), and the second endpoint device 202-2' can send a SIP reply 166 over the network without the need to inquire with the manager 102 in the course of setting up a communication session.

Figure 5:
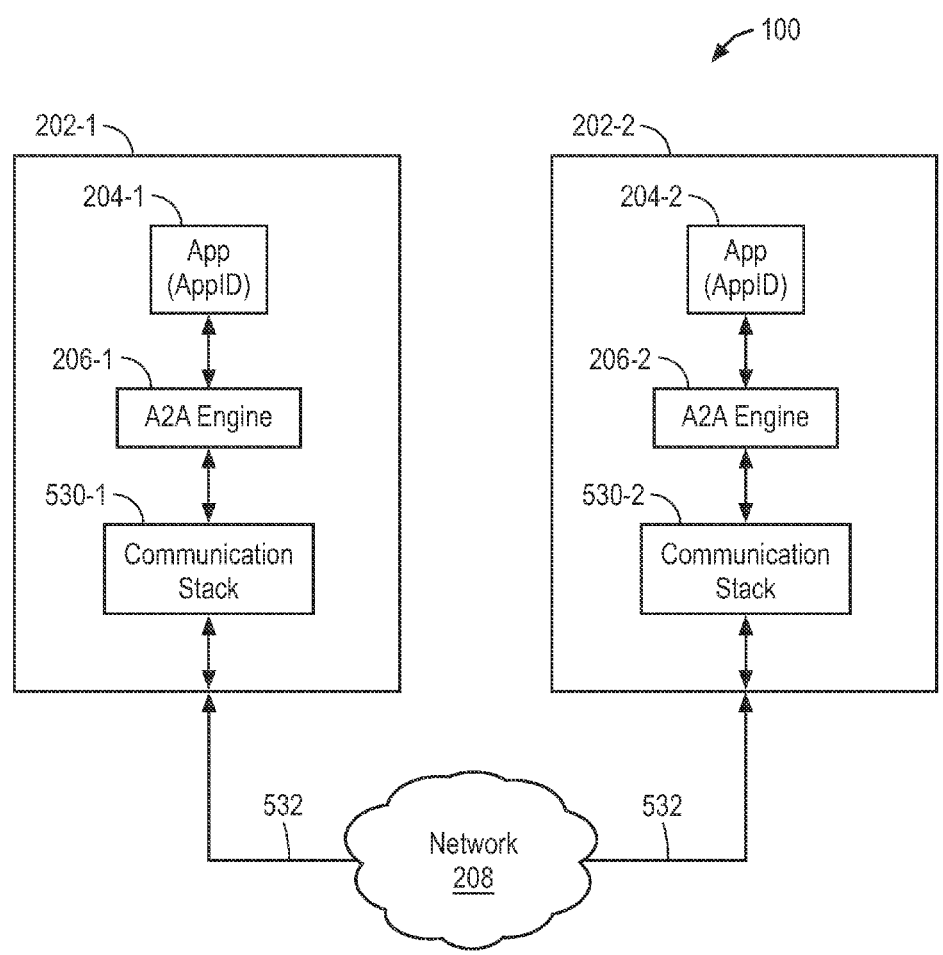
FIG. 5 is an illustrative drawing of the system of FIGS. 1-2 in which media communication has been successfully initiated and in which communication protocol stacks are used to transmit media data between endpoint devices in accordance with some embodiments.

FIG. 5 is an illustrative drawing of the system 100 of FIG. 2A in which media communication has been successfully initiated and in which communication protocol stacks 530-1, 530-2 are used to transmit media data between the first and second endpoint devices 202-1, 202-2. Both the first and second communication protocol stacks 530-1, 530-2 are layered protocol stacks. In general, network protocols are layered in that network functionality is divided into layers, each layer performing a well-defined service relying on the services of the layer below it in a protocol stack and providing services to the layer above in the stack. In general, a communication protocol is used to define a software based system that provides communication services at one layer in the stack. The resulting layered protocol is referred to as a protocol stack. A protocol stack defines network communication functionality that involves multiple protocols. More particularly, the protocol stack layers comprise instructions encoded in non-transitory media to cause the endpoint devices 202-1, 202-2 and machines within the network 208 to implement network functionality defined by the protocol layers.

In some embodiments, the first and second communication protocol stacks 530-1, 530-2 are compliant with the IMS network architecture. An IMS protocol stack includes different protocols defined by different standards or RFCs (Request for Comments) at different layers. In the IMS network architecture, SIP typically is used in conjunction with several other protocols that are part of an IMS compliant communication protocol stack including: 'RTP' (real-time transport protocol) and 'SDP' (session description protocol). RTP typically is used to encode and split the real-time multimedia data (e.g., audio, video share, chat, file share, XMPP based protocols and extensions (e.g., 'Jingle' service for voice over IP) and other peer-to-peer real-time communication mechanisms) into packets and transport such packets over the Internet. SDP typically is used to describe and encode capabilities of session participants. Such a description can be used to negotiate the characteristics of the session, such as codecs used to encode media and transport protocol to use, so that all the devices can participate in a session. It will be appreciated that the IMS network architecture may specify the use of different protocol options for different specific uses.

FIG. 5 shows that one or more communication sessions 532 are established between the first and second endpoint devices 202-1, 202-2 following successful initiation pursuant to the signaling protocol of FIG. 2A. FIG. 5 also shows that the communication sessions 532 transfer data across the network 208 pursuant to protocols specified by the identical protocol stack instances 530-1, 530-2. As explained more fully below, the A2A engine instances 206-1, 206-2 act as interfaces: (1) to convert method calls requests or messages received from the A2A enabled application instances 204-1, 204-2 to a form useable over the network 208; (2) to convert network packets or frames received from the network 208 to a form useable by the A2A enabled application instances 204-1, 204-2; and (3) to route control data and media data communicated across the network 208 during the sessions 532 between the respective application instances 204-1, 204-2 and the protocol stack instances 530-1, 530-2.

Figure 6:
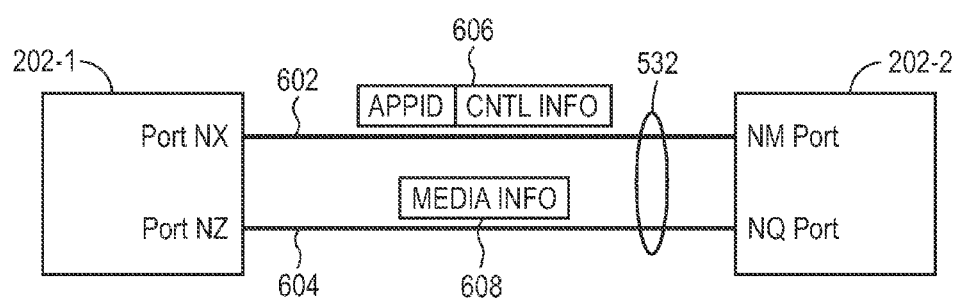
FIG. 6 is an illustrative drawing showing details of the media sessions of FIG. 5 and showing different example ports associated with the media sessions.

FIG. 6 is an illustrative drawing showing details of the media sessions 532 of FIG. 5 and showing different example ports associated with the media sessions. The example media sessions 532 actually include two communication sessions that have been set up between the first device 202-1 and the second device 202-2: a media control signal session 602 and a media (e.g., video) session 604. The control signal session 602 is used to communicate SIP messages that are used to set up the media session 604 and to control delivery of media using the media session 604. In this illustrative example, the media session 604 transmits video data between the devices. Both the control session 602 and the video session 604 send information within frame structures 606, 608. The frame structures 606 of the control session 602 include AppID information, which acts as the unique global identifier that is shared by the first and second application instances 204-1, 204-2 and that indicates the A2A enabled application 204-1, 204-2 to which the media session 604 pertains.

It will be appreciated that the sessions 602, 604 are associated with the A2A application instances 204-1, 204-2 based upon the shared AppID rather based upon software port numbers. Thus, ports need not be allocated in advance to specific applications and may be associated with a media session based upon factors such as availability. Sessions 602, 604 may be associated with different software ports on the first and second devices 202-1, 202-2. In this example, the media control signal session 602 is associated with port 'NX' of the first device 202-1 and is associated with port 'NM' of the second device 202-2. The media session 604 is associated with port 'NZ' of the first device 202-1 and with port 'NQ' of the second device 202-2.

Figure 7:
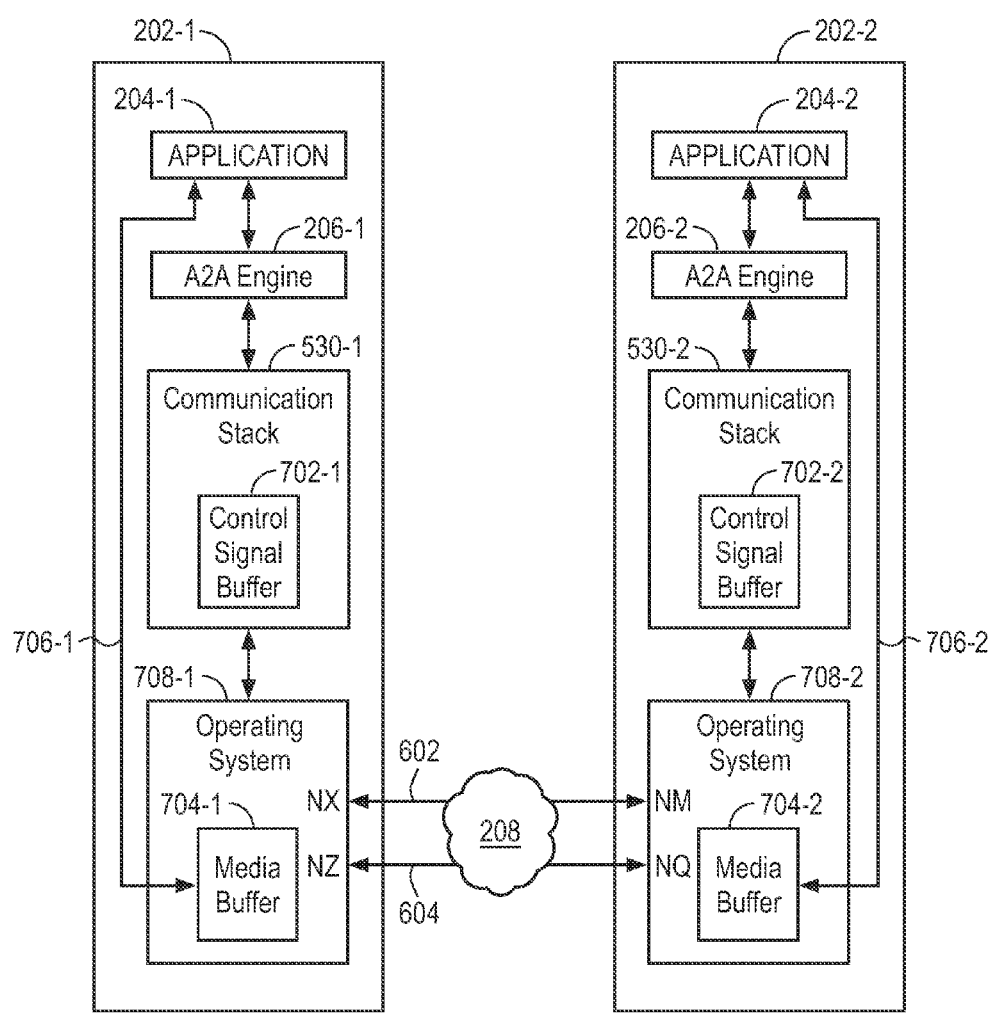
FIG. 7 is an illustrative drawing of the system that shows that one or more data buffers are allocated within the first and second endpoint devices following successful initiation of sessions pursuant to the signaling protocol of FIG. 2A in accordance with some embodiments.

FIG. 7 is an illustrative drawing of the system 100 that shows that one or more data buffers are allocated within the first and second endpoint devices 202-1, 202-2 following successful initiation of sessions 602, 604 pursuant to the signaling protocol of FIG. 2A in accordance with some embodiments. In this illustrative example, a first buffer 702-1 allocated within non-transitory storage on the first device 202-1 temporarily stores control data that is labeled with the shared AppID and that is communicated using the control session 602. A corresponding second buffer 702-2 allocated within non-transitory storage on the second device 202-2 temporarily stores control data that is labeled with the shared AppID and that is communicated using the control session 602.

During operation, control information received by respective buffers 702-1, 702-2 is respectively processed in accordance with respective communication stacks 530-1, 530-2. The communication stacks 530-1, 530-2 inform the respective A2A engines of processed control information. The first A2A second A2A engines 206-1, 206-2 act as respective interfaces to access information within buffers 702-1, 702-2 and to perform translation of control signal messages between a form used over the network 208 and buffered in buffers 702-1, 702-2 and a form that is understandable to the first and second instances of the A2A application 204-1, 204-2. The first A2A second A2A engines 206-1, 206-2 also act as respective interfaces to use AppIDs to route translated control messages between the first and second buffers 702-1, 702-2 and the appropriate application instances 204-1, 204-2 based upon AppIDs.

Similarly, a third buffer 704-1 allocated within non-transitory storage on the first device 202-1 temporarily stores media data that is labeled with the shared AppID and that is communicated using the control session 604. A corresponding fourth buffer 704-2 allocated within non-transitory storage on the second device 202-2 temporarily stores media data that is labeled with the shared AppID and that is communicated using the control session 602. In some embodiments, the A2A engine instances 206-1, 206-2 act to configure the respective endpoint devices 202-1, 202-2 to provide respective media channels 706-1, 706-2 between ports accessible at the device operating system 708-1, 708-2 and the respective A2A applications 204-1, 204-2 running on the devices 202-1, 202-2. These media communication channels 706-1, 706-2 permit faster communication of media data (e.g., video data). An A2A enabled application typically is designated by the operating system as a foreground process that is allocated more processor cycles than is the communication stack related processes, which typically are designated as background processes. Moreover, the media communication channels allow media to travel between respective operating system level ports coupled to the media session 604 and the first and second instances of the A2A application 204-1, 204-2 without traversal of the A2A engine 206-1, 206-2 thereby obviating a need for inter-process communication to transfer media data between the communication stack related processes and an A2A enabled application.

Figure 8:
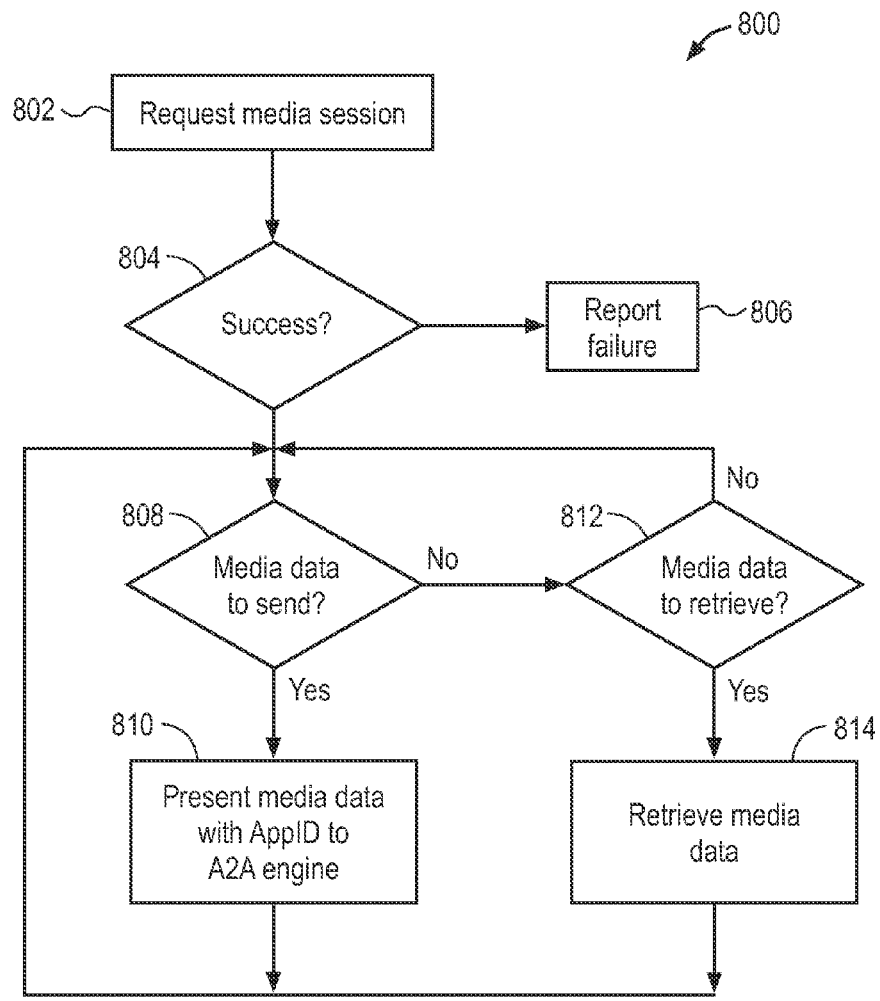
FIG. 8 is an illustrative flow diagram that represents a process in which an A2A enabled application conducts a media session in accordance with some embodiments.

FIG. 8 is an illustrative flow diagram that represents a process in which an A2A enabled application conducts a media session in accordance with some embodiments. It will be appreciated that the process 800 is applicable to both the first and second instances of the A2A enabled application 204-1, 204-2. Module 802 makes a request to a corresponding A2A engine 206-1, 206-2 to initiate of a media session in accordance with the signal protocol of FIG. 2A. For example, a user may input a request to endpoint device 202-1 to identify other users (e.g., fiends or contacts) whose devices are loaded with an instance of a particular A2A application and then may input to the device 202-1 a request to invite one or more of those other users to engage in communication through that A2A application. For example, the A2A application may be a game application that involves video media, voice media and game data. In some embodiments, such request includes a token generated internally by the requesting A2A enabled application. In other embodiments, the request may include secret information associated with the A2A enabled application so that the corresponding A2A engine can generate the token. Decision module 804 determines whether the media session is successfully initiated. If not, then module 806 reports the failure to initiate the media session. Decision module 808 determines whether the A2A enabled application has media data to send to a corresponding instance of the A2A enabled application running on another device. If yes, then module 810 presents the media data together with application's AppID to the A2A engine. If not, then decision 812 determines whether media data has been presented by the A2A engine. If yes, then module 814 retrieves the media data from the A2A engine. If not then, control flows back to decision module 808. Moreover, following operation of each of modules 810 and 814 control flows back to decision module 808.

Figure 9:
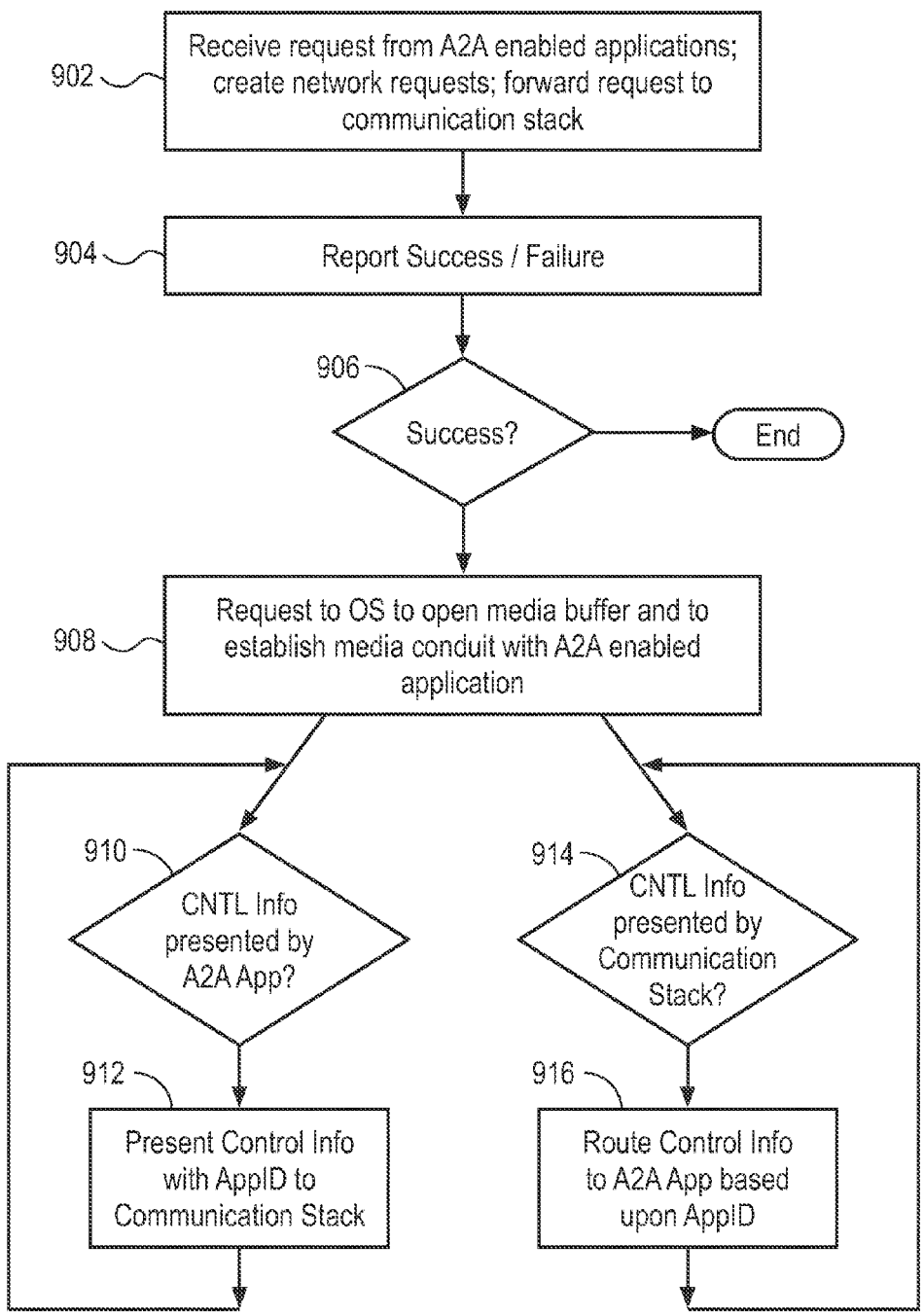
FIG. 9 is an illustrative flow diagram that represents a process in which an A2A engine interacts with an A2A enabled application and with a communication protocol stack in accordance with some embodiments.

FIG. 9 is an illustrative flow diagram that represents a process 900 in which an A2A engine interacts with an A2A enabled application and with a communication protocol stack in accordance with some embodiments. It will be appreciated that the process 900 is applicable to both the first and second instances of the A2A engine 206-1, 206-2. Module 902 receives a request from an A2A enabled application that identifies the application's AppID. As mentioned above, in some embodiments, such request includes a token generated internally by the requesting A2A enabled application. In other embodiments, the request includes secret information associated with the A2A enabled application so that the corresponding A2A engine can generate the token. In response to the request from the application, module 902 creates a SIP request that includes the AppID, security (i.e. a token generated as a function of AppID and the secret key) and media type and forwards the SIP request to the communication protocol stack as explained with reference to FIG. 2A and FIG. 5. It will be appreciated that, as explained with reference to FIG. 2A, in some embodiments, the SIP request directs one or more proxy servers on the network to send a message to the A2A application manager 102 to obtain authorization from the A2A application manager 102 as a pre-condition to sending the request to set up a media session to another instance of the application running on a different endpoint device. Module 904 reports to the requesting A2A enabled application whether the media session was successfully initiated or failed to initiate. If the initiation fails, then decision module 906 causes the process to end. If the initiation succeeds, then decision module 906 passes control to module 908, which causes operating system (708-1 or 708-2) to allocate media buffer (704-1 or 704-2) and to create a communication conduit directly with an A2A enabled application (204-1 or 204-2) that uses the media buffer. It will be appreciated that in some embodiments, once this communication conduit is set up, the A2A engine has no further role in the transfer of media to and from the A2A application. Module 908 determines control buffer opened by the communication protocol stack (e.g., buffer 702-1 or 702-2).

Decision modules 910, 912 operate in parallel. Decision module 910 determines whether control information associated with an AppID has been presented by the A2A enabled application for delivery to the communication stack. If yes, then module 914 translates the control information to a form suitable for consumption by the protocol stack and presents the translated control information with the associated AppID header information received from the A2A enabled application to the communication stack for provisions to the control buffer. If not, then control returns to decision module 910, which continues to determine whether media data has been presented by the A2A enabled application.

Decision module 912 determines whether control data with associated AppID header information has been presented in control data buffer by the communication protocol stack for delivery to an A2A enabled application. If yes, then module 914 presents the translates the received control data and routes the control data to an A2A enabled application having the same AppID as the AppID contained within the presented control data. If not, then control returns to decision module 912, which continues to determine whether media data has been presented by the communication stack.

It will be appreciated that although only a single A2A enabled application is running on each endpoint device in the illustrated example, it is possible to run multiple A2A enabled applications on each endpoint device. Each A2A enabled application will have a unique AppID. The A2A engine routes control messages from a communications stack and different A2A enabled applications based upon the AppIDs. Also, it will be understood that a single control session may control media sessions for multiple different A2A enabled applications. For each different A2A enabled application, the control session may set up one or more media sessions that are dedicated to that A2A enabled application. Frames or packets of information communicated over the control session are routed to the different A2A applications based upon AppIDs contained within the frames or packets. Moreover, although the illustrative example herein describes communication between two A2A applications that have the same AppIDs, communication also may be established between two A2A enabled applications having different AppIDs.

HARDWARE EMBODIMENT

Figure 10:
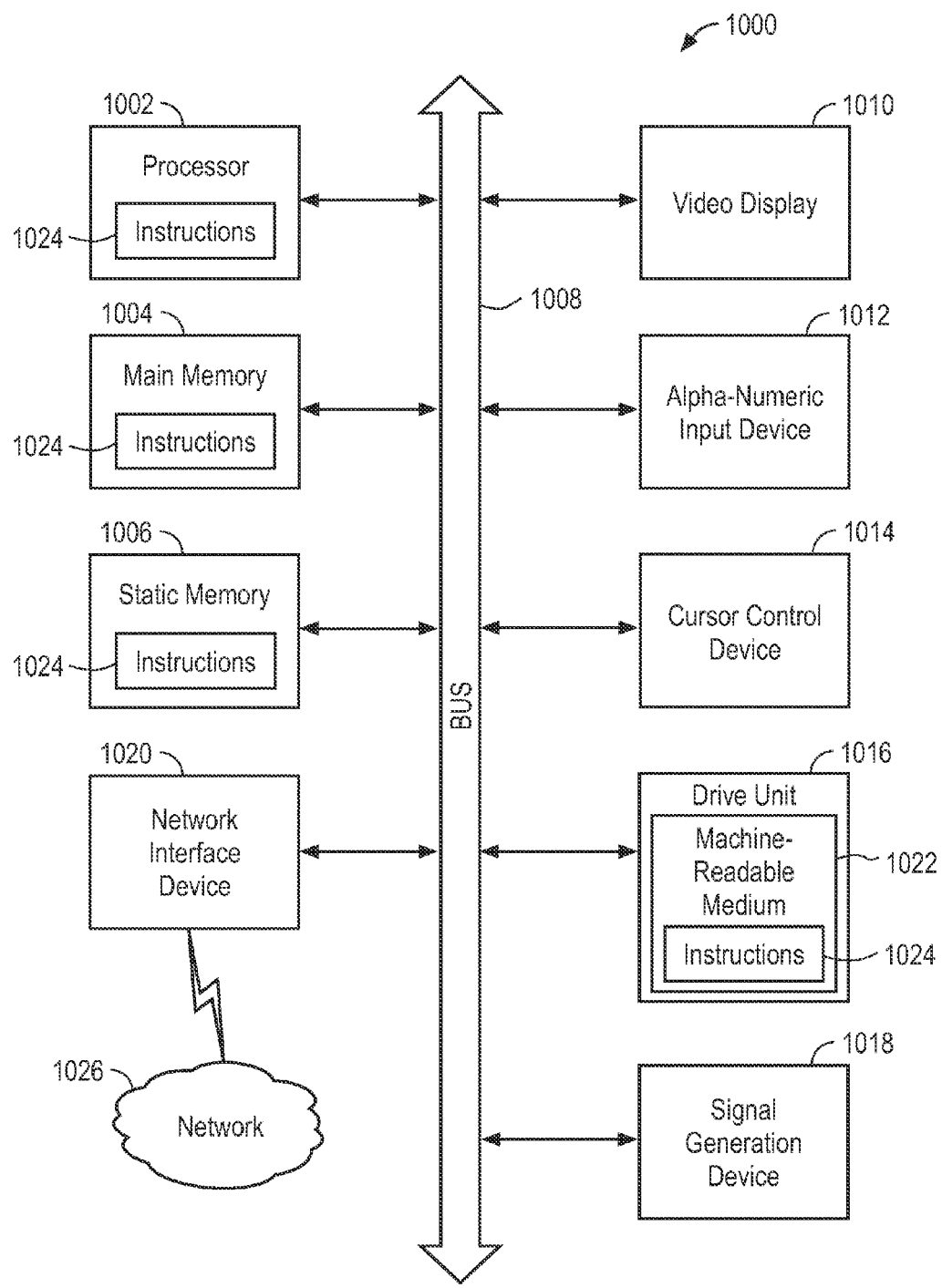
FIG. 10 is a block diagram of a computer processing system that may act as an endpoint device within which a set of instructions, for causing the computer to perform any one or more of the methodologies discussed herein, may be executed.

FIG. 10 is a block diagram of a computer processing system that may act as an endpoint device within which a set of instructions, for causing the computer to perform any one or more of the methodologies discussed herein, may be executed. The example computer processing system 1000 includes processor 1122 (e.g., a central processing unit (CPU), a graphics processing unit (GPU) or both), non-transitory main memory storage 1004 and non-transitory static memory storage 1006, which communicate with each other via bus 1008. The processing system 1000 may further include video display unit 1020 (e.g., a plasma display, a liquid crystal display (LCD) or a cathode ray tube (CRT)). The processing system 1000 also includes alphanumeric input device 1022 (e.g., a keyboard), a user interface (UI) navigation device 1014 (e.g., a mouse, touch screen, or the like), a disk drive unit 1116, a signal generation device 10118 (e.g., a speaker), and a network interface device 1020.

The disk drive unit 1026 includes non-transitory computer-readable storage device 1122 on which is stored one or more sets of instructions and data structures (e.g., software 1024) embodying or utilized by any one or more of the methodologies or functions described herein. The software 1024 may also reside, completely or at least partially, within a computer readable storage device such as the non-transitory main memory storage device 1004 and/or within the processor 1022 during execution thereof by the processing system 1100, the non-transitory main memory storage device 1004 and the processor 1022 also constituting computer-readable, tangible media.

The software 1024 may further be transmitted or received over network 1126 via a network interface device 1020 utilizing any one of a number of well-known transfer protocols (e.g., HTTP).

While the computer-readable storage device 1022 is shown in an example embodiment to be a single medium, the term "computer-readable storage device" should be taken to include a single medium or multiple media (e.g., a centralized or distributed database, and/or associated caches and servers) that store the one or more sets of instructions. The term "computer-readable storage device" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable storage device" shall accordingly be taken to include, but not be limited to, solid-state memories, and optical and magnetic media.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

Therefore, the foregoing description and drawings of embodiments are merely illustrative of the principles of the invention. Various modifications can be made to the embodiments by those skilled in the art without departing from the spirit and scope of the invention, which is defined in the appended claims.

The invention claimed is:

1. A method to communicate media information over a network comprising:

in response to a request from a first application running on a first endpoint device for a media connection with a second application on a second endpoint device, wherein the first application includes an application identifier (AppID) and secret information, sending a network message over the network, wherein the network message includes the AppID and a token computed as a function of at least the secret information, wherein the network message includes a media connection request for a media connection between the first application and the second application, wherein the network message includes an instruction to a proxy server to send an authorization request that includes the token over the network to an application manager server to request use of the token in validating that the first application is authorized to send the media connection request over the network to the second application;

communicating control information over a control session set up between the first endpoint device and the second endpoint device in response to the media connection request;

wherein the control information includes the AppID associated with the first application; and communicating media information over a media session set up between the first endpoint device and the second endpoint device in response to the media connection request.

2. The method of claim 1, wherein the request received from the first application includes the AppID.

3. The method of claim 1, wherein the request received from the first application includes the token.

4. The method of claim 1, wherein the request received from the first application includes the AppID and the secret information; further including:

producing the token as a function of at least the secret information.

5. The method of claim 1 further including:

converting the request received from the first application to the network request.

6. The method of claim 5, wherein the request includes a header that includes the AppID.

7. The method of claim 1 further including:

converting the request received from the first application to a Session Initiation Protocol (SIP) request;

wherein sending the network message over the network includes sending the SIP request.

8. The method of claim 7, wherein the SIP request includes a header that includes the AppID.

9. The method of claim 1 further including:

allocating a buffer within the first endpoint device to send and receive control information over the control session.

10. The method of claim 1 further including:

allocating a buffer within the first endpoint device to send and receive media information over the media session.

11. The method of claim 1, wherein the first application and the second application are different instances of the same application and are associated with the same AppID.

12. The method of claim 1, wherein the first application and the second application are associated with different AppIDs.

13. The method of claim 1, wherein the request received from the first application includes the token.

14. The method of claim 1, wherein the request received from the first application includes the AppID and the secret information; further including:

producing the token as a function of at least the secret information.

15. A method to communicate media information over a network comprising:

in response to a request from a first application running on a first endpoint device for a media connection with a second application on a second endpoint device, wherein the first application includes an application identifier (AppID) and secret information, sending a network message over the network, wherein the network message includes the AppID and a token computed as a function of at least the secret information, wherein the network message includes a media connection request for a media connection between the first application and the second application, wherein the network message includes an instruction to a proxy server to send an authorization request that includes the token over the network to an application manager server to request use of the token in validating that the first application is authorized to send the media connection request over the network to the second application.

16. An article of manufacture that includes non-transitory storage media that includes program code to cause an endpoint device, which includes a processor and a communication protocol stack for use in communication over a network, to implement a process comprising:

in response to a request from a first application running on a first endpoint device for a media connection with a second application on a second endpoint device, wherein the first application includes an application identifier (AppID) and secret information, sending a network message over the network, wherein the network message includes the AppID and a token computed as a function of at least the secret information, wherein the network message includes a media connection request for a media connection between the first application and the second application, wherein the network message includes an instruction to a proxy server to send an authorization request that includes the token over the network to an application manager server to request use of the token in validating that the first application is authorized to send the media connection request over the network to the second application.

* * * * *

UNITED STATES PATENT AND TRADEMARK OFFICE
CERTIFICATE OF CORRECTION

PATENT NO. : 8,327,005 B2  
APPLICATION NO. : 13/276211  
DATED : December 4, 2012  
INVENTOR(S) : Schroeder, Jr. et al.

Page 1 of 1

It is certified that error appears in the above-identified patent and that said Letters Patent is hereby corrected as shown below:

On the Title Page, Item (56)

On page 2, in column 1, under "Other Publications", line 2, delete "3007" and insert --2007--, therefor On page 2, in column 2, under "Other Publications", line 3, delete "H," and insert --H.,--, therefor On page 2, in column 2, under "Other Publications", line 14, delete "Dictionary, 18th Edition"," and insert --Dictionary", 18th Edition,--, therefor On page 2, in column 2, under "Other Publications", line 30, delete ""Terminal Disclaimer Filed", U.S. Appl. No. 13/276,229." and insert --"U.S. Appl. No. 13/276,229, Terminal Disclaimer filed Aug. 6, 2012", 7 pgs.--, therefor Signed and Sealed this  
Sixteenth Day of December, 2014

Michelle K. Lee  
*Deputy Director of the United States Patent and Trademark Office*